United States Patent [19]
Granger, deceased et al.

[11] 3,974,710
[45] Aug. 17, 1976

[54] GEAR DRIVE FOR ROTARY PRESS AND THE LIKE

[76] Inventors: Wallace H. Granger, deceased, late of Kentfield, Calif., by Nina Kathryn Granger, executrix, 106 Cypress Ave., Kentfield, Calif. 94904

[22] Filed: June 2, 1975

[21] Appl. No.: 582,804

[52] U.S. Cl. ............................................. 74/465
[51] Int. Cl.² ..................................... F16H 55/06
[58] Field of Search ............................ 74/465, 464

[56] References Cited
UNITED STATES PATENTS

| | | | |
|---|---|---|---|
| 2,074,837 | 3/1937 | Fraser | 74/465 X |
| 3,108,488 | 10/1963 | Huszar | 74/465 |
| 3,748,920 | 7/1973 | Lambev | 74/465 |

*Primary Examiner*—Leonard H. Gerin
*Attorney, Agent, or Firm*—Gregg, Hendricson, Caplan & Becker

[57] ABSTRACT

Gear drive, more particularly a gear drive for a rotary printing press, wherein there are gear couples each consisting of a male gear, and a female gear, the male gear having rollers instead of teeth, such rollers being seated in sockets, the female gear having sockets which are complementary to the rollers; the rollers being mounted in side plates and by such means that they are held firmly (but resiliently) against the bottoms of their sockets. An alternative design employs sprockets with a roller chain drive.

8 Claims, 16 Drawing Figures

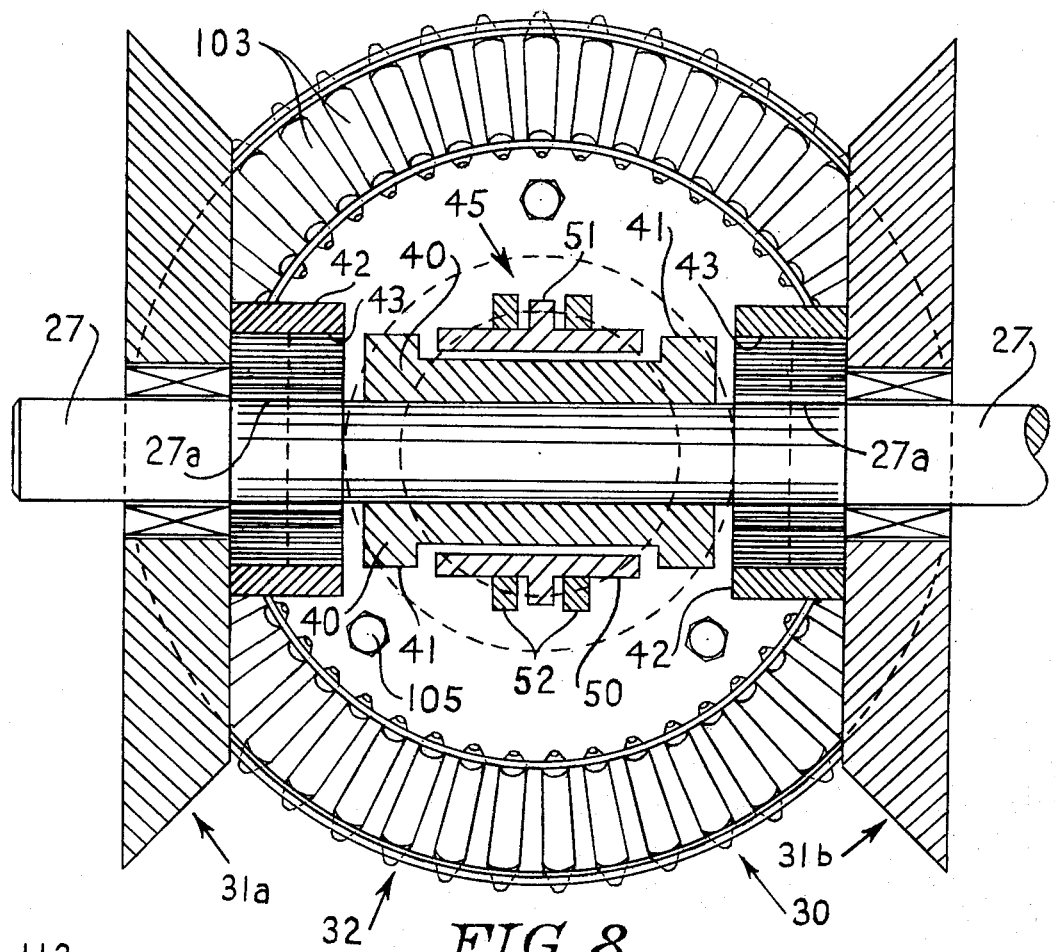
FIG. 8
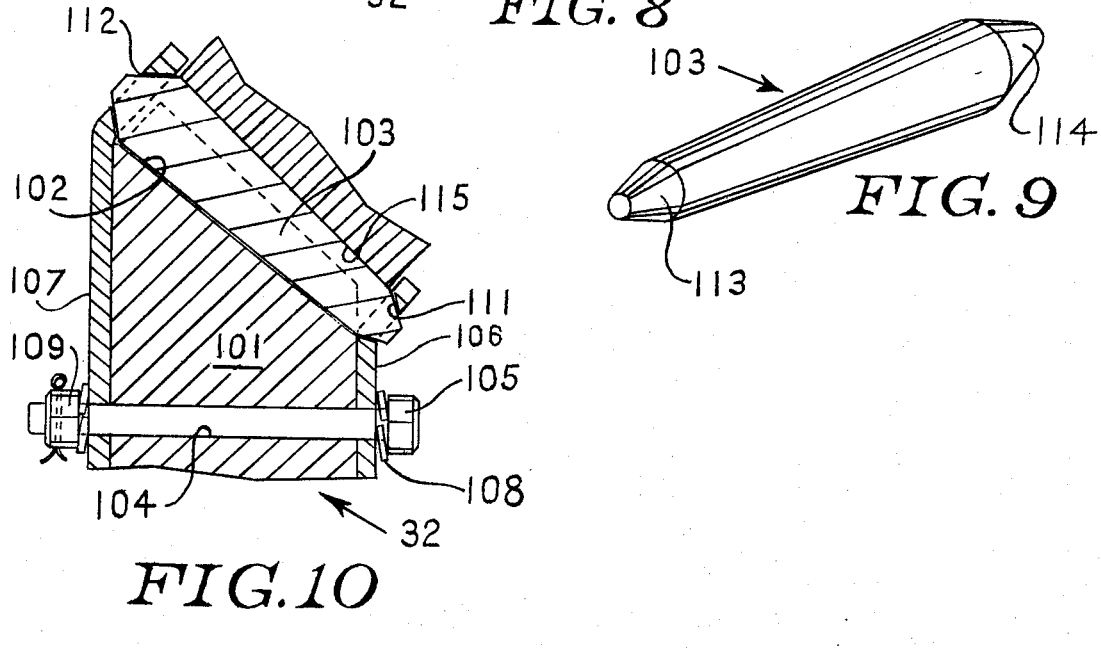
FIG. 9
FIG. 10

GEAR DRIVE FOR ROTARY PRESS AND THE LIKE

This invention relates to a gear drive, more particularly to a gear drive for a rotary printing press, although it is applicable to other types of machinery.

Rotary newspaper printing presses are normally formed with a large number of cylinders or rollers with at least some of them being longitudinally oscillated to apply ink to a plate cylinder, for example. An improved and materially simplified rotary newspaper printing press is shown in my U.S. Pat. No. 3,585,932 and although the present invention is not limited to use therein it is highly advantageous in connection therewith and thus in the following description reference is made to such a rotary press.

A rotary newspaper printing press as disclosed in my above-noted patent includes an inking cylinder, ink transfer cylinder, plate cylinder and impression cylinder for letterpress printing. For offset printing simultaneously upon both sides of a web of paper, the press includes two sets of the foregoing cylinders with the impression cylinder of one set serving as its blanket cylinder and as the impression cylinder for the other set. Aside from the manner of applying ink to the plate cylinder, conventional rotary newspaper printing presses are similar to the foregoing.

The cylinders of a rotary press are typically provided with coaxial gears of conventional construction which mesh with one another and serve to drive the cylinders. Such gears are a source of considerable trouble, of inconvenience and of health hazard especially in high speed rotary printing presses. Thus, the gears become very noisy, especially as the gear teeth wear and they interfere with changes in the press, for example, in changing from offset to letterpress and vice versa.

It is an object of the present invention to provide improvements in gear drives.

It is a further and more particular object of the invention to provide improvements in the gear drives of rotary printing presses.

The above and other objects of the invention will be apparent from the ensuing description and the appended claims.

In accordance with the present invention, I provide a gear train in which cylindrical driving members (herein called "rollers") are provided. These members are called rollers for convenience, but as will become apparent, they need not and preferably do not roll freely. These rollers are mounted on the male gears and they mesh with complementary cavities or sockets in the female gears. That is to say, rather than employing conventional gear teeth which mesh with one another, I provide rollers which are separable from the male gears and I provide female gears which mesh with the rollers. In the preferred embodiment of the invention the rollers are mounted in sockets in the male gears and mesh with sockets in the female gears for meshing with such rollers. In another embodiment, all of the gears are in effect sprockets and are driven by a roller chain.

Where the gears are bevel gears, the rollers are tapered rather than cylindrical.

In one embodiment (the preferred embodiment) of the present invention, each pair of intermeshing gears consists of a male gear and a female gear. The male gear is provided with sockets to receive the rollers, which project from the periphery of the gear disc. Side plates hold the rollers resiliently but firmly against the bottoms of the sockets. The female gear of each such pair is formed on its periphery with sockets which are complementary to and receive and mesh with the rollers of the male gears.

Certain embodiments of the invention are illustrated by way of example in the accompanying drawings, in which:

FIG. 8 is a view in elevation of one of the bevel gear drives in that portion of the press which is beneath the floor level, and it illustrates the bevel gears employed in this portion of the gear drive and constructed in accordance with the invention;

FIG. 9 is a perspective view of one of the tapered rollers employed with the male gear of the bevel gear drive;

FIG. 10 is a fragmentary, sectional view taken through FIG. 8 and showing the meshing of two of the bevel gears;

Figure 1:
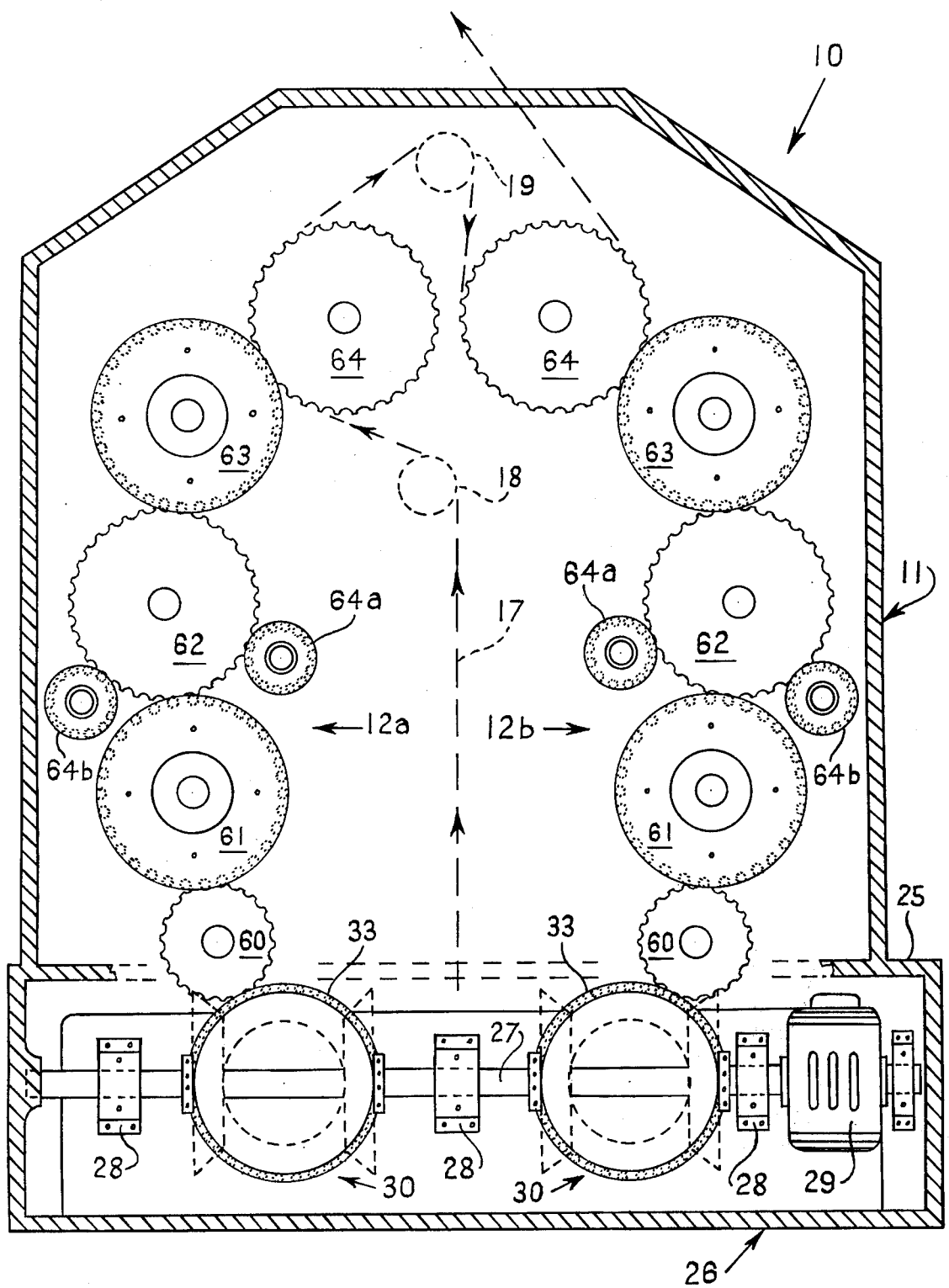
FIG. 1 is an end view of a complete rotary printing press having two couples as seen from one side and with the side wall or enclosure removed.
Figure 1A:
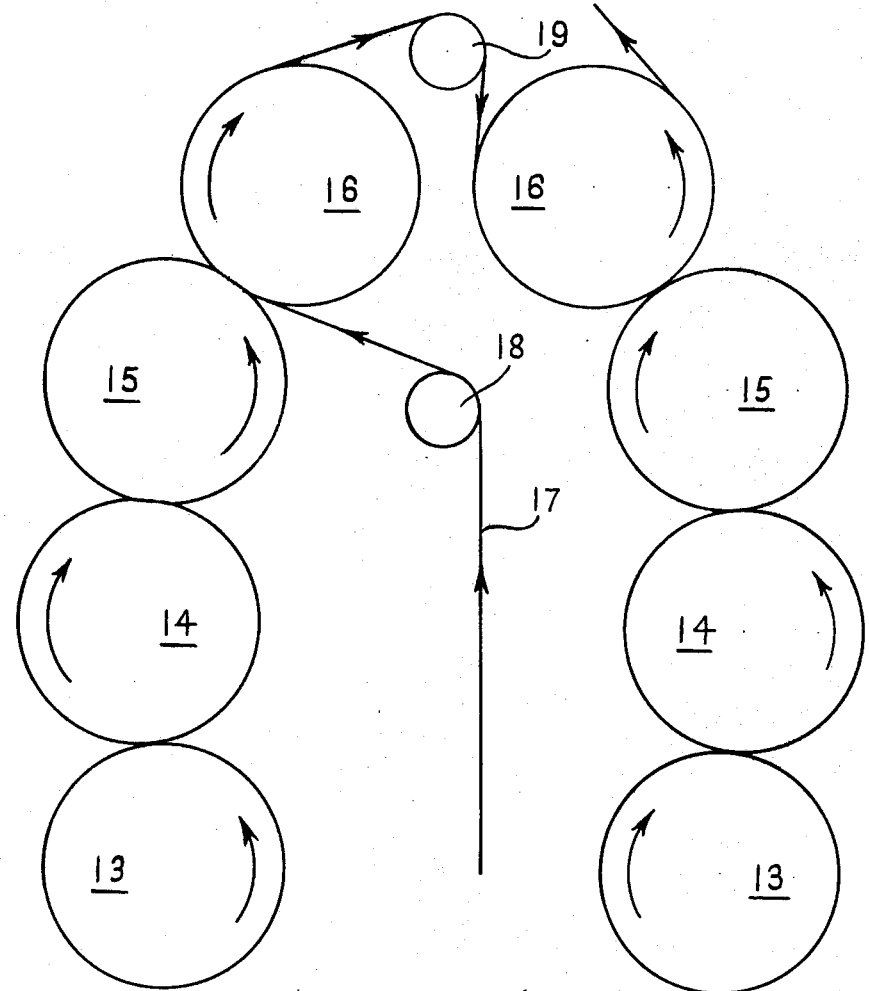
FIG. 1A is a diagrammatic view of the cylinders of such a rotary press, these cylinders being concealed from view in FIG. 1 by the gears.

Referring now to FIG. 1, a rotary press is indicated by the reference numeral 10 which is shown as a letterpress. As will become apparent, it can with a relatively modest degree of change be readily converted to an offset press. Within the housing 11 are two pairs of presses, or couples, 12a and 12b. In FIG. 1 and (except in FIG. 1A) in all of the other figures, only the driving elements of the press are shown. It will be understood that, as shown by way of illustration in the diagrammatic drawing of FIG. 1A, cylinders of my press shown in my U.S. Pat. No. 3,585,932 are provided, for example an inking cylinder 13, an ink transfer cylinder 14, a plate cylinder 15 and an impression cylinder 16. Also shown in FIG. 1A are the web 17 which is to be printed, and guide rollers 18 and 19.

The drive system of the present invention is applicable to a wide variety of different types of machinery;

however, it is particularly advantageous in connection with high speed, rotary newspaper printing presses. Certain of these advantages may not be immediately apparent and are thus briefly commented upon herein. Conventional newspaper press drive systems incorporated helical gears, spiral gears and spur gears. Each of these types of gears is intended to contact mating gears thereof at a point contact or a contact of very small area; however, as the gears wear through use, the area of contact increases and the play between gears increases. As a consequence, the noise generated by gear systems employing such types of gears becomes a very serious problem. The present invention, on the other hand, is particularly adapted to engage rollers over a very substantial surface thereof with the sockets of female gears so that the problem of wear is materially reduced. Additionally, the rollers of the present invention are preferably formed of a material such as nylon or the like material so as to provide a truly silent gear train.

The printing cylinder of a rotary printing press must not only rotate on a true axis but also must be prevented from any axial movement. The use of helical gears in drive systems for rotary presses creates end thrust problems inasmuch as contacting helical gears create an axial thrust so that end thrust bearings are required to minimize axial plate cylinder movement. The present invention does not experience this problem and thus end thrust bearings are not required.

The present invention is additionally particularly advantageous for rotary newspaper press drives wherein the press may be employed for letterpress and offset printing. Offset printing on both sides of a web is normally accomplished by providing the impression cylinders of the press unit in position to apply pressure to both sides of the web passing therebetween. Also conventionally, the impression cylinder gears in an offset press are in contact in order to ensure the two impression cylinders being rotated at the same rate. In order to convert such an offset press into a letterpress, the impression cylinders must be moved a sufficient distance to disconnect the respective gears thereof and this then requires a rather substantial displacement of the impression cylinders. In the present invention, the two impression cylinders in offset printing are maintained in controlled circumferential movement by the roller gear drive of the present invention so that the impression cylinder gear sprockets do not at any time contact each other. The impression cylinders are rotated by their respective plate cylinders and the lack of play and backlash in the gear drive of the present invention precludes the necessity of gearing the two impression cylinders together. This is highly advantageous in that only a slight movement of the impression cylinders then need be made to separate them sufficiently for the press unit to be operated letterpress. The gear teeth of a conventional offset press must be moved out of intermeshing contact for the press to be used as letterpress or planographic, for otherwise the printing couples cannot be made double reversible. Reference is made to my copending U.S. patent application Ser. No. 538,790, filed Jan. 6, 1975 disclosing a structure for the conversion of a rotary printing press from letterpress to offset and the minimal necessary movement of impression cylinders as afforded by the present invention will be seen to be highly advantageous therein.

Referring again to FIG. 1, the floor level of the press is shown at 25 beneath which is a drive assembly within a housing 26. This drive assembly which includes a main drive shaft 27 suitably journalled in bearings 28 is driven through suitable gearing (not shown) by a motor 29. Two identical gear drives 30 are shown which may be conventional gear drives, but preferably embody features of the present invention and (as to a shift mechanism) of my U.S. patent application Ser. No. 325,164, filed Jan. 19, 1973, entitled Rotary Newspaper Printing Press Drive System.

Referring now to FIGS. 8, 9 and 10, each gear drive 30 comprises a pair of opposed bevel gears 31A and 31B which, in turn, (according to the axial positions of the shift mechanism described below) serve to drive a mating bevel gear 32 to which is fixed a roller gear 33 (see FIG. 1) which is constructed in accordance with the present invention and which forms a part of the gear train in the housing 11. The roller gear 33 is a male gear which is constructed like the male gears within the housing 11 as described below. The bevel gear 31A (31B) and the bevel gear 32 form a gear couple which also employs the roller gear construction of the present invention as described below. The opposing bevel gears 31A and 31B are provided with a shifting means which will now be described.

The shaft 27 is splined at 27A and it slidably but non-rotatably receives a sleeve 40 having flanges 41 which oppose hubs 42 that are fixed to the gears 31A and 31B. The hubs 42 are formed with grooves 43 to mate with grooves on flanges 41. A shift mechanism 45 is provided which comprises a sleeve 50 slidable on sleeve 40 between flanges 41 and having an annular rib 51 embraced by a bifurcated shift lever 52. The lever 52 is connected by suitable means (not shown) to a shift mechanism accessible to an operator on the exterior of the press, and by means of which an operator may shift the sleeve 40 to the right to engage the right hand (as viewed in FIG. 8) grooved flange 41 with the mating grooves 43 of the hub 42 of bevel gear 31B. This will cause bevel gear 31B to be driven. By shifting the sleeve 40 to the left, the gear 31A is driven. Thus, the direction of rotation of the press cylinders may be reversed.

The construction of the bevel gears 31A, 31B and 32 will be described with reference to FIGS. 9 and 10 after the other gears have been described.

Referring again to FIG. 1 (which is simplified by omitting details shown in FIG. 8), each roller gear 33 meshes with and drives a female gear 60 which is the first in a gear train 60-61-62-63-64. The gears 61, 62, 63, and 64 drive, respectively, the inking cylinder 13, the ink transfer cylinder 14, the plate cylinder 15, and the impression cylinder 16.

Figures 2, 3:
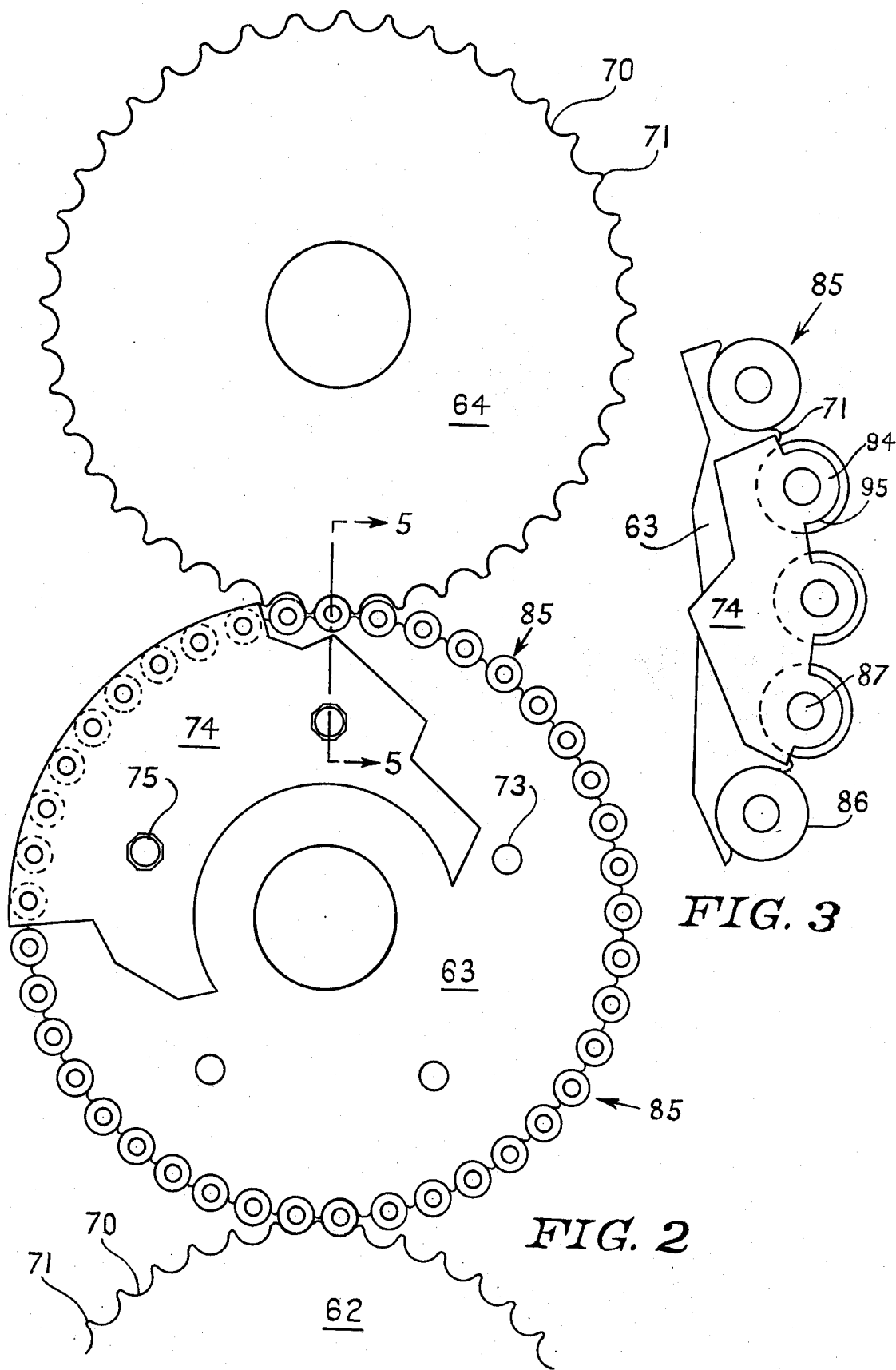
FIG. 2 is a view in elevation showing two female gears meshing with a male gear.
FIG. 3 is a fragmentary view on a larger scale of a peripheral portion of one of the male gears showing the scalloped configuration of the side plates to allow removal of gears without interferring with one another.

Referring now to FIGS. 2, 3, 4 and 5, the female gears 60, 62 and 64 are identical except for size and number of sockets and the male gears 61 and 63 may be identical. Male gears 64A and 64B (see FIG. 1) are also provided to drive ink removal cylinders. If ink transfer cylinder 14 (see FIG. 1A) rotates clockwise as viewed in FIGS. 1 and 1A, it is the inking removal cylinder driven by gear 64A that is in contact with and removes ink from the ink transfer cylinder. By suitable shift means either ink removal cylinder may be brought into contact with the ink transfer cylinder and the other ink removal cylinder moved out of contact. Therefore, if the direction of the press couple 12A is reversed and ink transfer cylinder is caused to rotate counterclockwise, the gear 64A and its ink removal cylinder are shifted out of contact and the gear 64B and its ink removal cylinder are shifted into contact with ink transfer cylinder 14. In FIG. 2 the gears 62, 63 and 64 are shown shifted in the plane of the sheet for convenience of illustration. Each female gear 62 and 64 is in the form of a flat disc made of a suitable metal (as are the other gears), for example steel. Each of the female gears is formed about its periphery with sockets 70 separated by projections 71 which may be regarded as teeth. The male gear 63 is similarly formed of a flat disc and it is also formed with bolt holes 73 to which side plates 74 are secured by bolts 75.

Figure 5:
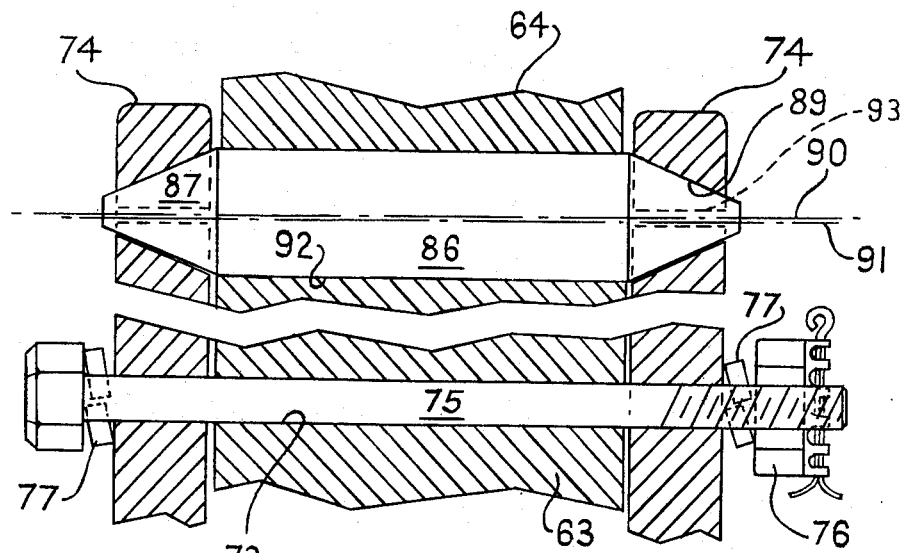
FIG. 5 is a fragmentary sectional view taken along the line 5—5 of FIG. 2 and on a larger scale than in FIG. 2, and it shows the mounting of a roller on the male gear.
Figure 6:
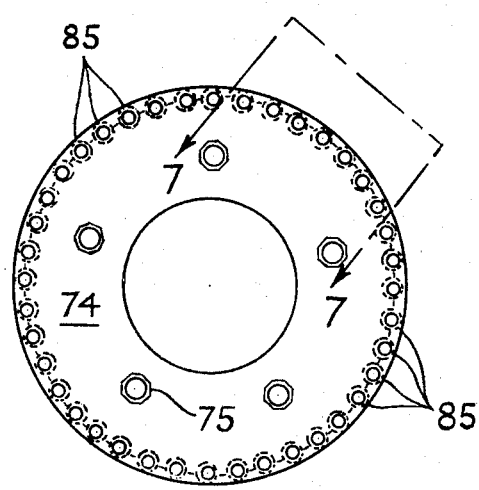
FIG. 6 is a view in elevation of a male gear disassembled from the press.
Figure 7:
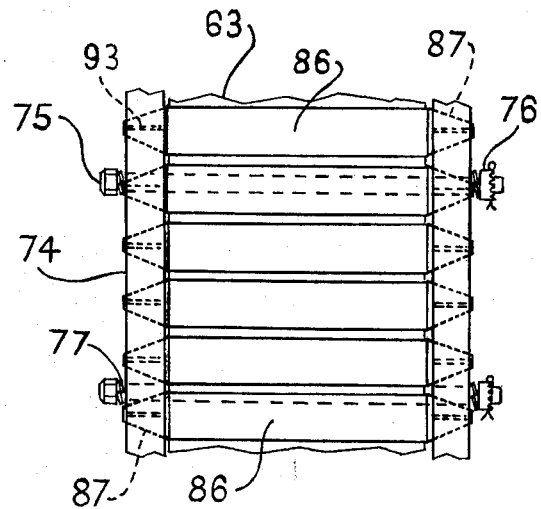
FIG. 7 is a view taken along the line 7—7 of FIG. 6.
Figure 11:
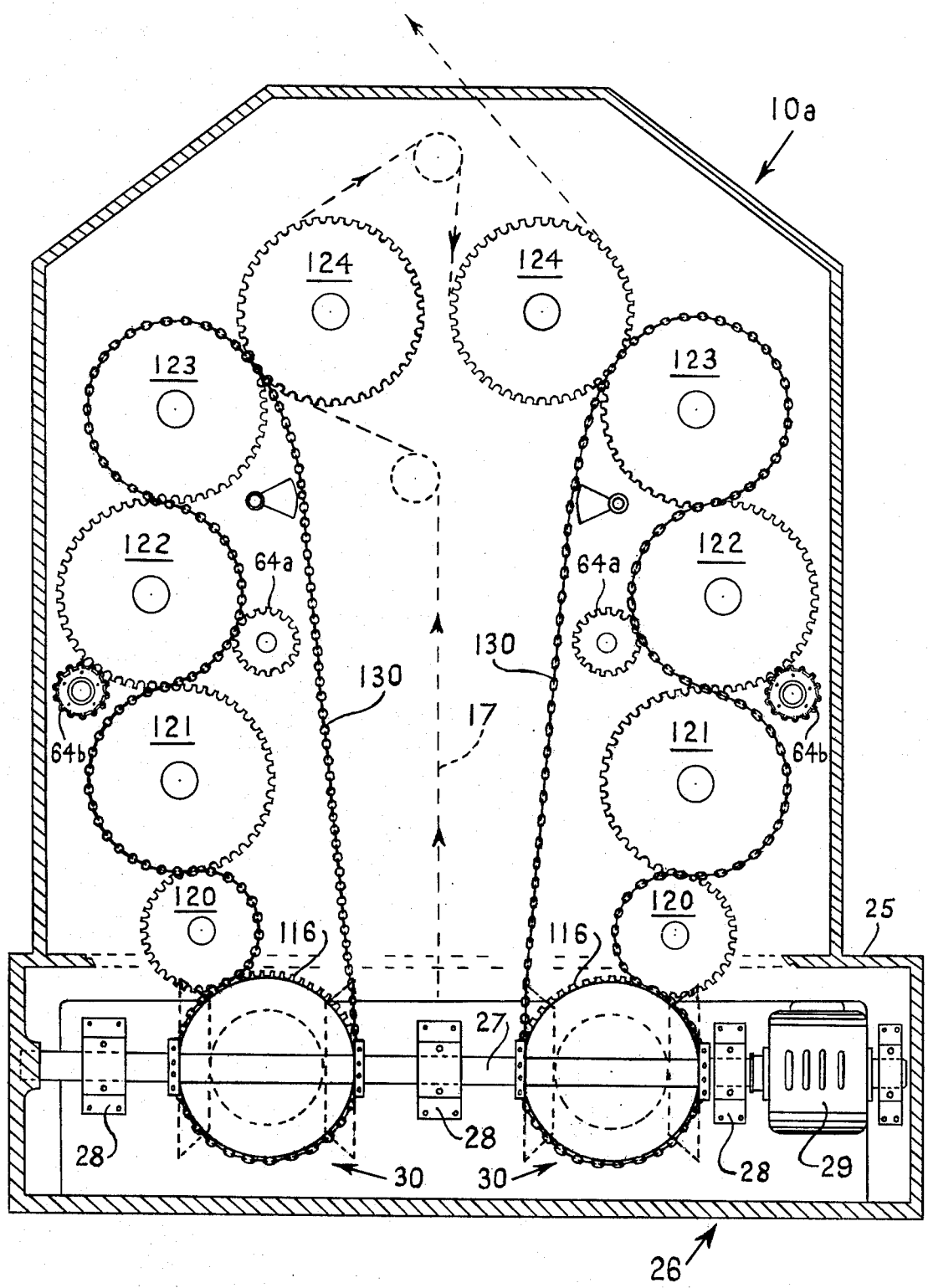
FIG. 11 is a view similar to that of FIG. 1, but showing a press drive employing a chain drive instead of a gear drive.

Referring now to FIG. 5, the side plates 74 are bolted to the disc 72 by the bolts 75 and nuts 76. A lock washer 77 is interposed between the head of each bolt 75 and one side of the sideplates 74 and a lock washer 77 is interposed between the castle nut 76 and the other sideplate 74. The lock washers 77 serve as springs, and other types of springs may be used. Cotter pins 76a secure the castle nuts in place.

Figure 4:
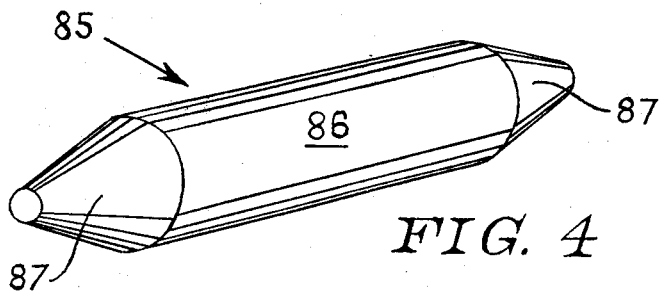
FIG. 4 is a perspective view of a roller as used in the male gears of FIGS. 1, 2 and 3.

Referring now to FIG. 4, one of the rollers 85 is shown in perspective. It comprises a cylindrical body portion 86 and tapered ends 87.

Referring again to FIG. 5, at its upper edge each of the sideplates 74 is formed with conical mounting holes 89 which taper outwardly, there being two such holes for each of the rollers 85 with pairs of holes in the two sideplates 74 being axially aligned. The roller axis is indicated by the line 90 and below it the axis of a pair of aligned, tapered mounting holes 89 is indicated by the line 91. As will be seen, these axes are separated and the roller axis 90 is slightly above the mounting hole axis 91.

As a result of this construction, and as the sideplates 74 are drawn closer together by tightening the bolts 75, the upper surface of each mounting hole 89 will bear against the upper surface of the respective tapered end 87 of a roller 85. The resultant downward force will have the effect of seating the roller 85 firmly against the bottom of its socket 92, the sockets 92 being formed in the periphery of the gear. Oil grooves are provided at 93 for lubrication. The tightness with which the rollers are held against the bottoms of the sockets 92 is controlled by the degree of tightening of the bolts 75. However, the lock washers 76 provide a resilient yielding force such that if, during operation, any excessive force is exerted on the rollers or the sideplates 74, the latter will move outwardly against the force of the lock washers or springs 76. This will relieve the force and will prevent or minimize damage.

It will be apparent that if it is desired to remove, for example, one of the female gears 60, 62 or 64 for repair or replacement, the sideplates 74 of the male gear or gears meshing with such female gear will interfere and one of the sideplates 74 of each interferring male gear will have to be removed. This will introduce the possibility that the rollers 85 of the exposed male gear or gears will drop out. They can, of course, be removed and replaced. An alternative construction is shown in FIG. 3 which obviates the necessity of doing so. Referring to FIG. 3, the sideplates 74 are provided with a scalloped periphery formed by projections 94 which are spaced to provide cavities or sockets 95 which coincide with the teeth 71 of the mating female gears. By this means either a female gear or a male gear may be removed without the need to remove sideplates 74.

Referring now to FIGS. 8, 9 and 10, one of the drive gear assemblies 30 is shown on a larger scale than in FIG. 1 and it has been described above insofar as the shifting mechanism is concerned. The gear 32 is formed by a disc 101 having peripheral sockets 102 to receive tapered rollers 103, and it is also formed with bolt holes 104 to receive bolts 105 that serve to mount and hold sideplates 106 and 107. Lock washers 108 and nuts 109 are provided which serve the same purpose as the lock washers 77 and nuts 76 in FIGS. 1 and 5. The sideplates 106 and 107 are formed with tapered mounting holes 111 and 112, respectively, to receive the tapered ends 113 and 114 of tapered rollers 103.

The bevel gears 31A and 31B are formed with sockets 115 to secure the roller 103, being tapered to conform to these rollers.

Figure 12:
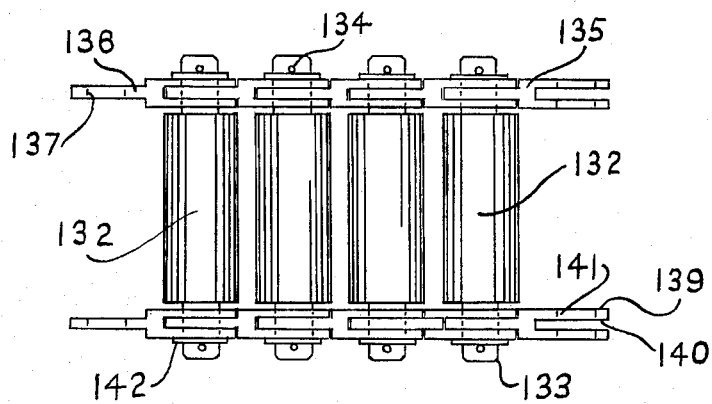
FIG. 12 is a plan view of a segment of roller chain employed in the embodiment of FIG. 11.
Figure 13:
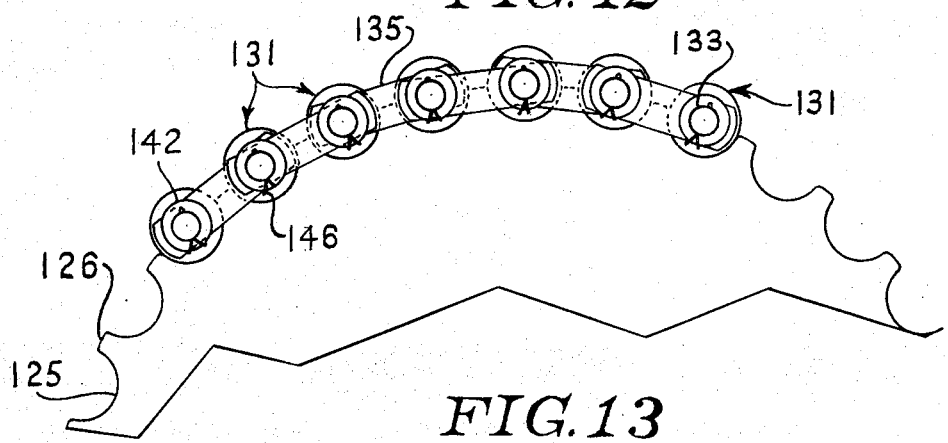
FIG. 13 is a fragmentary view showing the meshing relation between one of the gears or sprockets and the roller chain.
Figure 14:
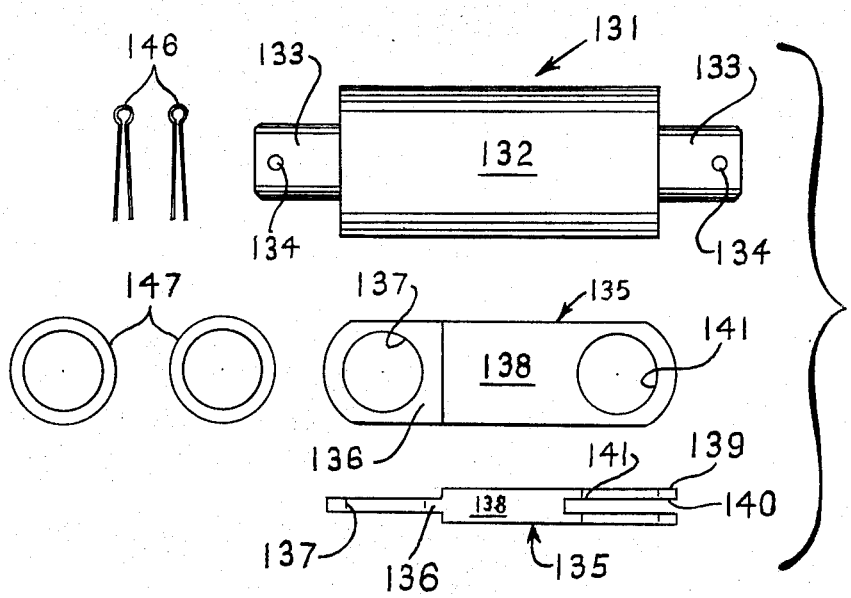
FIG. 14 is a composite view of the components of a single link of the chain.

Referring now to FIGS. 11 to 15, a chain drive is shown instead of a gear drive as in FIGS. 1 to 10. That is to say, in this embodiment of the invention the rollers are carried by a chain and the gears are female gears. In effect, they are sprockets. The gear drives 30 are the same as in FIGS. 1 to 10, except that the roller gears 33 are replaced by sprockets 116. A train of sprockets 116, 120, 121, 122, 123 and 124 is provided in each of the couples corresponding to gears 33, 60, 61, 62, 63 and 64, respectively, of FIG. 1. The sprockets 116, 120, 121, 122, 123 and 124 are identical except for size and number of sockets 125 and teeth 126. An endless chain 130 is provided for each couple and is constructed as shown in FIGS. 12 to 14.

Referring to these figures, rollers 131 are provided each of which has a cylindrical body 132 and a trunnion 133 at each end, each of which is formed with a hole 134 to receive a cotter pin. Links 135 are provided each formed with a tail portion 136 formed with a hole 137, a body portion 138, and a bifurcated portion formed by forks 139 which are spaced apart at 140 and are formed with mating holes 141. Cotter pins are provided at 146 and washers at 147. The forks of each link 135 embraces the tail 136 of the next link. The trunnions 133 pass through holes 137 and 141.

Figure 15:
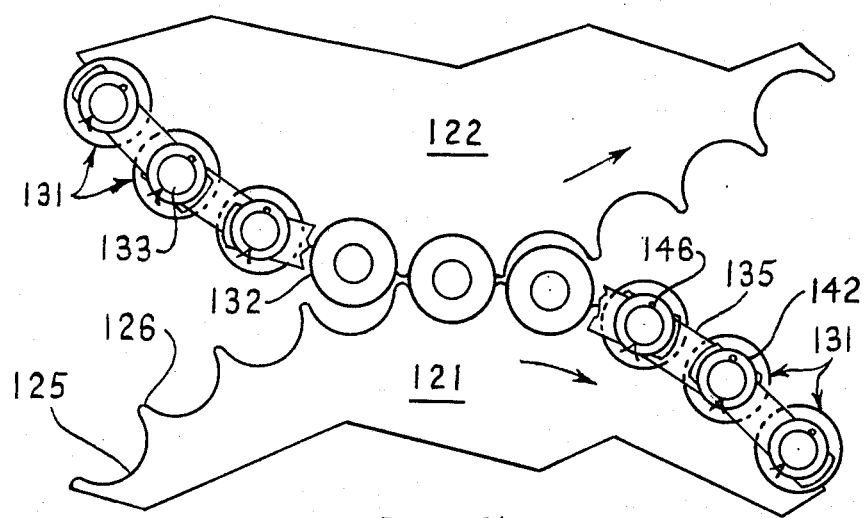
FIG. 15 is a view showing the meshing, driving relation between the roller chain and two gears or sprockets.

Referring now to FIG. 15, and assuming rotation as shown, the rollers 131 will act to pull the upper sprocket and to push the lower sprocket.

It will therefore be apparent that a new and advantageous gear drive has been provided which is especially useful for rotary presses.

I claim:
1. A roller gear comprising:
   a. a circular disc having sockets formed uniformly in its periphery;
   b. a pair of sideplates on opposite sides of the disc and secured thereto by means acting to force the sideplates inwardly toward the disc with an adjustable and resilient force, said plates being formed with outwardly tapering mounting holes arranged in pairs, with each pair consisting of a mounting hole in one sideplate and a mounting hole in the other sideplate, the members of such pair of mounting holes being in axial alignment with a peripheral socket of said disc;
   c. a roller mounted in each said peripheral socket and having outwardly tapering end portions mounted in the respective mounting holes, said rollers having longitudinal axes which, when the roller is seated in and contacts the bottom of its respective socket, is radially farther outward than the axis of the respective mounting holes.
2. The roller gear of claim 1 wherein the periphery of the disc is cylindrical and the rollers have cylindrical bodies between their tapered ends.

3. The roller gear of claim 1 wherein the gear disc is cut to form a bevelled gear and the rollers are similarly tapered.

4. A gear drive comprising at least one pair of intermeshing gears comprising a male gear and a female gear;
 a. said female gear being formed with peripheral open sockets;
 b. said male gear comprising
  1. a circular disc having sockets formed uniformly in its periphery;
  2. a pair of sideplates on opposite sides of the disc and secured thereto by means acting to force the sideplates inwardly toward the disc with an adjustable and resilient force, said plates being formed with outwardly tapering mounting holes arranged in pairs, with each pair consisting of a mounting hole in one sideplate and a mounting hole in the other sideplate, the members of such pair of mounting holes being in axial alignment and being aligned with a peripheral socket of said disc;
  3. a roller mounted in each said peripheral socket and having outwardly tapering end portions mounted in the respective mounting holes, said rollers having longitudinal axes which, when the roller is seated in and contacts the bottom of its respective socket, is radially farther outward than the axis of the respective mounting holes; said rollers meshing with the sockets of said female gear.

5. The gear drive of claim 4 wherein the periphery of the disc of the male gear is cylindrical and the rollers have cylindrical bodies between their tapered ends.

6. The gear drive of claim 4 wherein the male gear is cut to form a bevelled gear and the rollers are similarly tapered.

7. In a rotary printing press comprising at least one couple having a plate cylinder and a cooperating impression cylinder or blanket cylinder, the improvement which comprises a drive for said cylinders in the form of at least one male gear for one of the cylinders and a mating female gear for the other of said cylinders,
 said female gear being formed with peripheral sockets separated by teeth,
 said male gear comprising:
  a. a circular disc having sockets formed uniformly in its periphery;
  b. a pair of sideplates on opposite sides of the disc and secured thereto by means acting to force the sideplates inwardly toward the disc with an adjustable and resilient force, said plates being formed with outwardly tapering mounting holes arranged in pairs, with each pair consisting of a mounting hole in one sideplate and a mounting hole in the other sideplate, the members of such pair of mounting holes being in axial alignment and being aligned with a peripheral socket of said disc;
  c. a roller mounted in each said peripheral socket and having outwardly tapering end portions mounted in the respective mounting holes, said rollers having longitudinal axes which, when the roller is seated in and contacts the bottom of its respective socket, is radially farther outward than the axis of the respective mounting holes; said rollers meshing with the sockets of said female gear.

8. The press of claim 7 wherein each couple comprises an inking cylinder, an ink transfer cylinder, a plate cylinder and a blanket or impression cylinder, the drive for said cylinders comprising intermeshing male-female gear pairs constructed as in claim 7.

* * * * *